United States Patent [19]

Suzuki et al.

[11] Patent Number: 4,973,738
[45] Date of Patent: Nov. 27, 1990

[54] LIQUID CRYSTAL COMPOUNDS HAVING NAPHTHALENE NUCLEUS

[75] Inventors: Yoshiichi Suzuki; Ichiro Kuwamura; Takashi Hagiwara, all of Tokyo, Japan

[73] Assignee: Showa Shell Sekiyu K.K., Tokyo, Japan

[21] Appl. No.: 344,646

[22] Filed: Apr. 28, 1989

[30] Foreign Application Priority Data

Apr. 28, 1988 [JP] Japan .................................. 63-103763

[51] Int. Cl.$^5$ ............................................. C07C 69/76
[52] U.S. Cl. .................................... 560/080; 560/53; 560/85; 560/86; 252/299.600
[58] Field of Search ........................ 560/53, 80, 85, 86

[56] References Cited

U.S. PATENT DOCUMENTS

| | | | |
|---|---|---|---|
| 4,645,305 | 2/1987 | Yokokura et al. | 560/86 X |
| 4,728,458 | 3/1988 | Higuchi et al. | 560/86 X |
| 4,737,313 | 4/1988 | Saito et al. | 560/86 X |
| 4,764,619 | 8/1988 | Gunjima et al. | 560/86 X |
| 4,826,620 | 5/1989 | Heppke et al. | 560/86 X |

*Primary Examiner*—Werren B. Lone
*Assistant Examiner*—Vera C. Clarke
*Attorney, Agent, or Firm*—Sughrue, Mion, Zinn, Macpeak & Seas

[57] ABSTRACT

Novel ferroelectric liquid crystal compounds which may realize a stable molecular orientation which makes it possible to give a definite light-dark contrast in the no electric field state and attain a definite threshold property as well as hysteresis, and for making it possible to attain the dynamic driving as well as the high speed of response, owing to tri-stable phase thereof, of the general formulae (I) and (II)

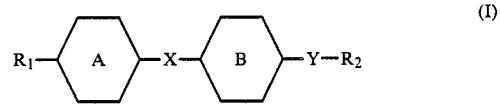

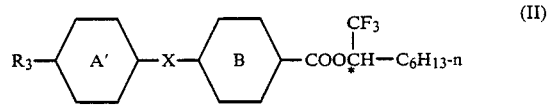

in which $R_1$ means an alkyl, alkoxy or alkyloxycarbonyl each of 1–20 carbon atoms, $R_2$ means optically active

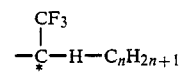

wherein n is an integer of 4–10, X means

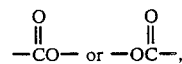

Y means 5 Claims, 7 Drawing Sheets

LIQUID CRYSTAL COMPOUNDS HAVING NAPHTHALENE NUCLEUS

BACKGROUND OF THE INVENTION AND RELATED ART

The invention relates to novel liquid crystal compounds, and more particularly to novel ferroelectric liquid crystal compounds showing tri-stable phases, particularly suitable for electrooptical image or display elements.

As electrooptical devices utilizing nematic liquid crystals, there have been proposed and actually used various devices of dynamic scattering mode (DSM), twisted nematic (TN) mode, guest-host (GH) mode and satellite tracking network (STN) mode. The devices of such nematic liquid crystals, however, are generally disadvantageous in the slow speed of response in the order of several m sec- several decades of m sec so that there are considerable limitations in the applied uses thereof. It is a reason of such slow speed of response that the torque to drive molecules of the liquid crystal compounds is fundamentally based on the dielectric constant anisotropy so that the torque force substantially dominates the property or performance thereof.

Thus, the ferroelectric liquid crystals were developed by Meyer et al (Le Journal de Physique, 36 (1975)-L-69). In JP-A No. 63-307837, improved ferroelectric liquid crystals showing bi-stable phases are disclosed. Some electrooptical devices utilizing such ferromagnetic liquid crystals and consequently having higher speed of response were proposed. For instance, JP-A No. 56-107216 discloses a device in which two molecular orientations, which are made parallel to a wall surface by releasing the twisted structure thereof owing to the force of the wall surface, may be varied depending on the polarity of the impressed electric field, which is theoretically based on the presence of a liquid crystal compound showing ideal bi-stable phase as shown in wave shapes of response to the electric field, FIG. 5.

In fact, however, such ideal compounds have not yet been found. The actually found liquid crystal shows the wave shapes of response to the electric field as shown in FIG. 6. When using such liquid crystal e.g. in a photoswitching circuit, as the impressed voltage is changed from the $\ominus$ side to the $\oplus$ side, the transmission factor (%) is gradually changed so that the simple ON-OFF change of the impressed voltage can not sufficiently attain the purpose.

Furthermore, so far as the liquid crystals of bi-stable phases having been synthesized until now are concerned, it is impossible to form a monodomain state, which is a perfect molecular orientation, due to an inevitable failure called discrimination or a disorder of the molecular orientation called twist, in the $S_A$ phase where no electric field is applied. Thus, it is difficult to realize such perfect two states orientation in a larger area.

Furthermore, when dynamically driving, inevitably the contrast is lowered and the visual field angle is narrowed due to the low threshold of the voltage causing a change of brightness in a specific range. Since the liquid crystals of the bi-stable phase having been synthesized until now show not the hysteresis as shown in FIG. 5 but the hysteresis as shown in FIG. 6 so as not to have the memory effect. In order to hold the stable Sc phase for the liquid crystals, it is necessary to continuously impress the voltage $V_3$ in FIG. 6 or continuously apply a high frequency, either of which causes a considerably much amount of energy loss.

SUMMARY OF THE INVENTION

It is an object of the invention, thus, to provide novel ferroelectric liquid crystal compounds of tri-stable phase, which may be utilized for realizing a stable molecular orientation which makes it possible to give a definite light-dark contrast in the no electric field state, and attain a definite threshold property as well as hysteresis, and for making it possible to attain the dynamic driving as well as the high speed of response.

Other objects of the invention and various advantages attained thereby are appreciated by those skilled in the art by studying the detailed explanation of the invention to be given hereafter.

The objects can be attained by novel liquid crystal compounds represented by general formulae (I) and (II);

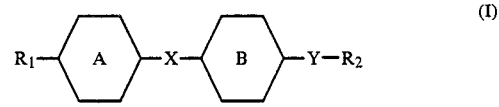

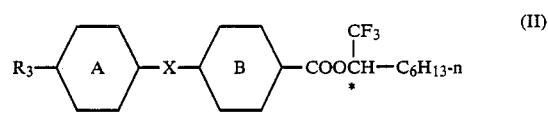

in which $R_1$ means an alkyl, alkoxy or alkyloxycarbonyl respectively having 1-20 carbon atoms, $R_2$ means an optically active

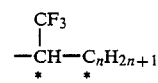

wherein n is an integer of 4-14 and more preferably of 6-12, X means

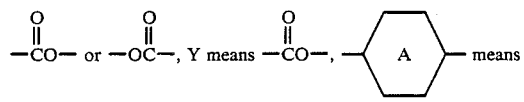

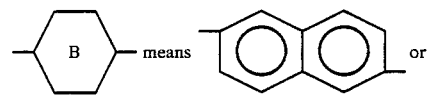

$R_3$ means an alkyoxycarbonyl of 5-15 carbon atoms and

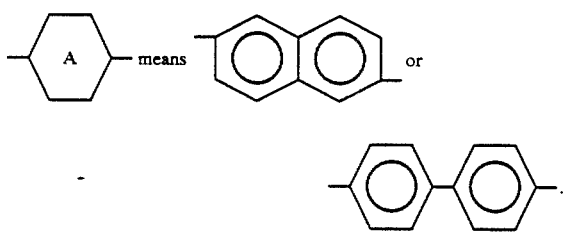

DESCRIPTION OF PREFERRED EMBODIMENTS OF THE INVENTION

Figure 8A:
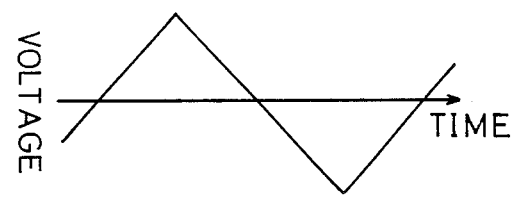
FIG. 8A shows a change of impressed voltage, of triangle wave, FIGS. 8B, C and D shown optical response respectively of a marketed nematic liquid crystal, a known liquid crystal of bi-stable phase, and a liquid crystal of tri-stable phase according to the invention.
Figure 8B:
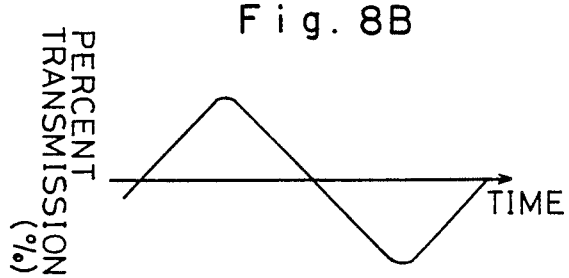
Figure 8C:
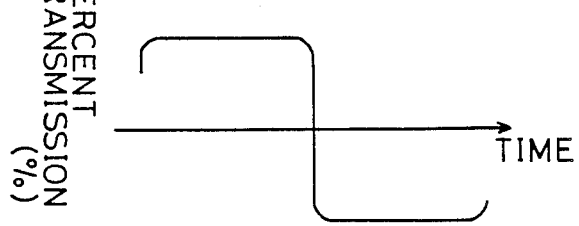
Figure 8D:
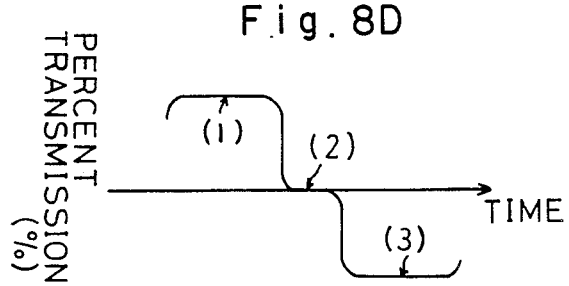

As for the tri-stable phase in the invention, it is meant that when the voltage is impressed as the triangle wave shapes as shown in FIG. 8A across the two electrode substrates between which ferroelectric liquid crystal is filled, said ferroelectric liquid crystal shows the first stable state of molecular orientation when no electric field is applied (see (1) in FIG. 8D), the second stable state different from the first one when applying the electric field (see (2) in FIG. 8D) and the third stable state different also from the second one (see (3) in FIG. 8D).

The marketed nematic liquid crystals and the usual ferroelectric liquid crystals of bi-stable phase respectively do not show such tri-stable phase, as seen from FIGS. 8B and 8C.

When using the usual ferromagnetic liquid crystals for the electrooptical devices, it is necessary for driving to use a very complex active matrix system so that the manufacture thereof necessitates troublesome steps and consequently a high cost and the device can not provide a larger image or display area. According to the liquid crystal compounds of tri-stable phase, said defects can be almost completely overcome.

The novel ferroelectric liquid crystal compounds of the invention can be manufactured in principle according to the following process.

(1) 2,6-Naphthalene-dicarboxylic acid dichloride is reacted with optically active 1-trifluoro-2-octanol in the presence of ethyl amine to obtain 6-(1-trifluoromethyloxycarbonyl)-naphthalene 2-carboxylic acid chloride (1).

The chloride (I) is reacted with 4'-hydroxybiphenyl-4-carboxylate in the presence of triethyl amine to obtain 4'-alkoxybiphenyl-6-(1-trifluoromethylheptylcarbonyl)-naphthalene-2-carboxylate (II).

(2) Methyl-4.-hydroxybiphenyl is reacted with benzyl bromide to obtain 4'-benzyloxybiphenyl-4-carboxylate, which is converted through hydrolysis to 4'-benzyloxybiphenyl-4-carboxylate, which is then reacted with thionyl chloride to obtain 4'-benzyloxybiphenyl-4-carboxylic acid chloride. The chloride is reacted with optically active 1-trifluoro-2-octanol 1-trifluoromethylheptyl-4'-benzyloxybiphenyl-4-carboxylate, which is subjected to catalytic hydrogenolysis to obtain 1-trifluoroheptyl-4'-hydroxybiphenyl-4-carboxylate (III).

The compound (III) is reacted with 2,6-naphthalenedicarboxylic acid dichloride in the presence of triethyl amine to obtain 6-[3-trifluoromethylheptyloxycarbonyl)-biphenyl-4-oxycarbonyl]-naphthalene-2-carboxylic acid chloride (IV).

The chloride (IV) is reacted with a higher alcohol in the presence of triethyl amine to obtain 4'-(1-trifluoromethylheptyloxycarbonyl)biphenyl-6-alkoxycarbonyl-naphthalene-2-carboxylate (V).

(3) The compound (I) is hydrolyzed to obtain 2-(1-trifluoromethylheptyloxycarbonyl)-naphthalene-6-carboxylic acid (VI).

4'-Hydroxy-4-alkoxybiphenyl is reacted with the compound (VI) in the presence of dicyclohexylcarbodiimide as dehydrating agent to obtain 4'-alkoxybiphenyl-2-(1-trifluoromethylheptyloxycarbonyl)-naphthalene-6-carboxylate (VII).

The above reactions may be represented by following flow charts.

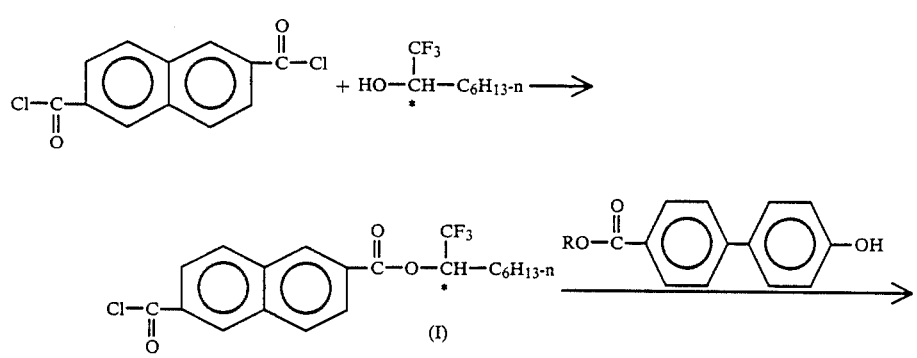

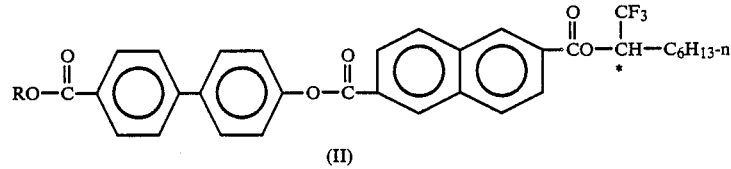
(II)
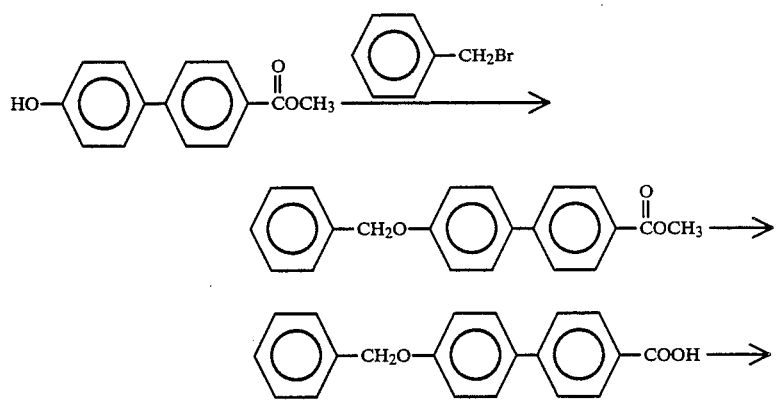
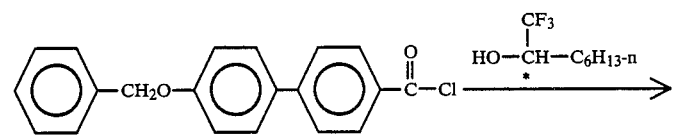
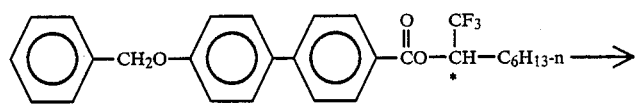
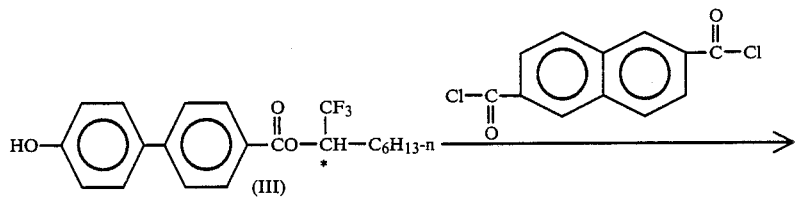
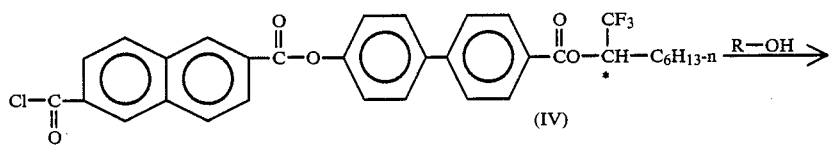
(III)
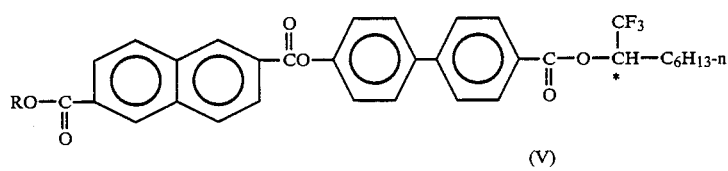
(IV)
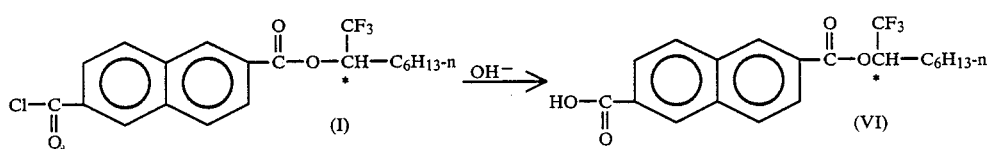
(V)
(I)    (VI)
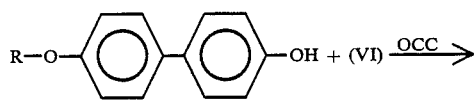

-continued

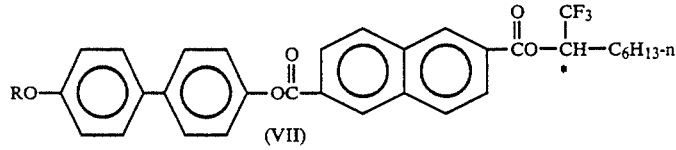

The invention will be explained in more detail by following Examples, but it is noted that the invention should not be restricted thereto.

EXAMPLE 1

(1) 6-(1-Trifluoromethylheptyloxycarbonyl)-naphathalene-2-carboxylic acid chloride

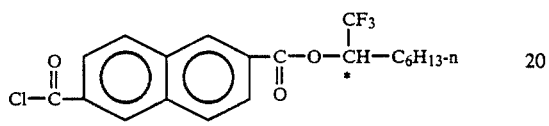

2,6-Naphthalene-dicarboxylic acid dichloride 0.84 g, optically active 1-trifluoro-2-octanol 0.55 g, triethyl amine 0.33 g and dimethyl aminopyridine 0.02 g are dissolved in 50 ml dichloroethane to be stirred at the room temperature for a whole day. The reaction mixture liquid is filtered. The filtrate is used for the following reaction.

(2) 4'-(n-decyloxycarbonyl)-biphenyl-4 6-(1-trifluoromethyl heptyloxycarbonyl)-naphthalene-2-carboxylate (Objective Compound)

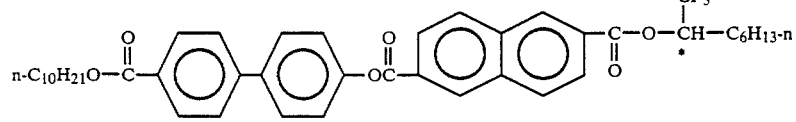

To the filtrate obtained in the above (1), added were n-decyl-4'-hydroxybiphenyl-4-carboxylate 1.1 g, triethyl amine 0.33 g and dimethylaminopyridine 0.02 g to be stirred at the room temperature for a whole day. The reaction liquid was filtered and the solvent was distilled off. The residue was purified according to the silica gel column chromatography (as developer hexane/ethyl acetate, 10:0.5). The crude product was recrystallized with ethanol to obtain the objective compound in the amount of 0.165 g which showed a specific rotatory power, $[\alpha]_D^{20} = +41.7°$.

The phase transition points of the objective liquid crystal compound were as follows as a result of observation by a microscope with hot stage.

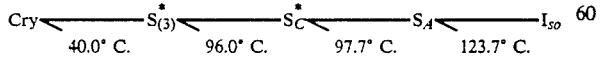

Figure 1:
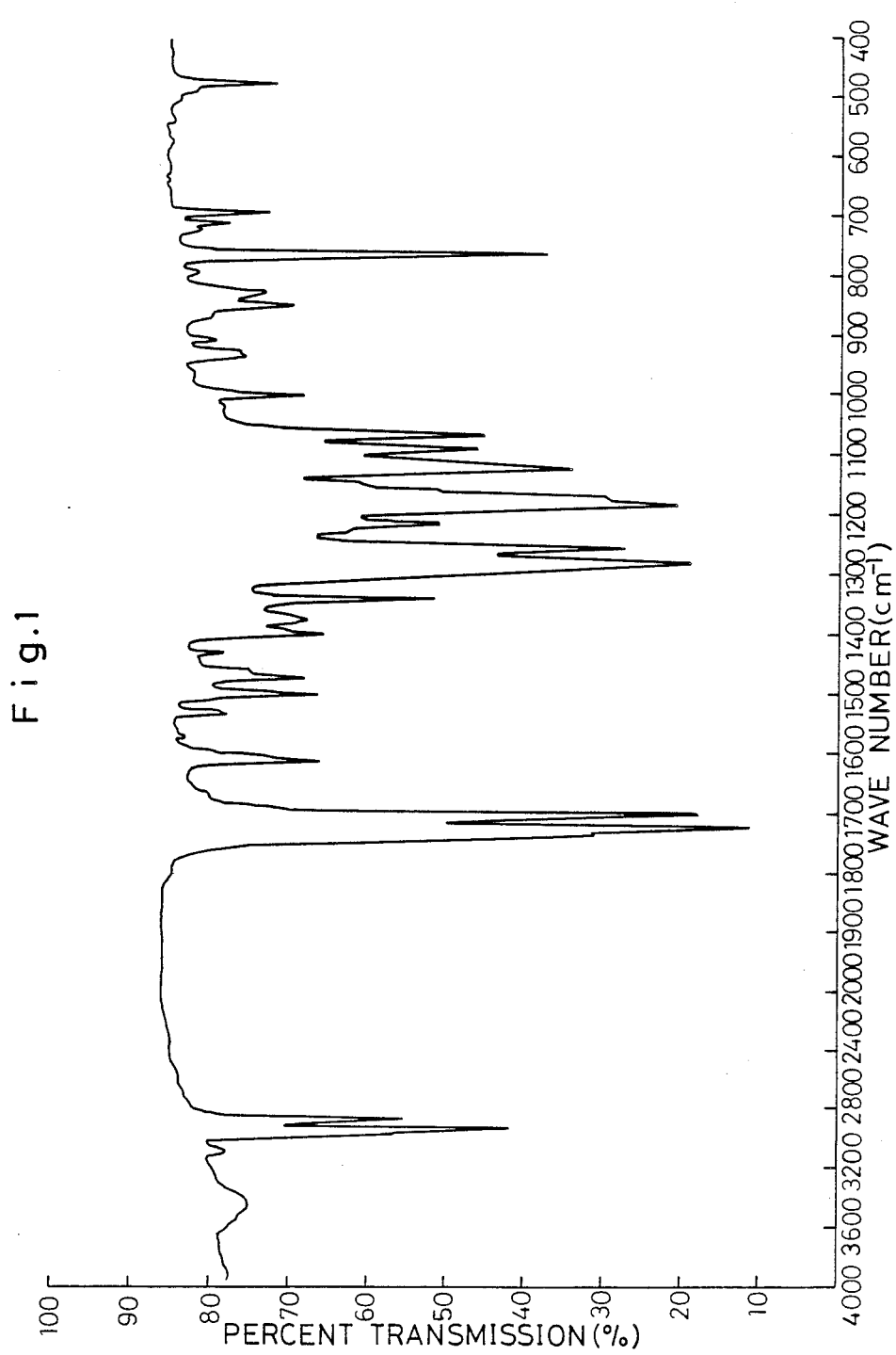
FIG. 1 shows an infrared absorption spectrum (KBr) of the objective compound in Example 1.

The infrared absorption spectrum of the objective compound is shown in FIG. 1.

EXAMPLE 2

(1) Methyl-4'-hydroxybiphenyl-4-carboxylate

4-Hydroxybiphenyl-4-carboxylic acid 5.0 g and concentrated sulfuric acid 0.2 g were taken in 150 ml methanol to be subjected to reflux for 24 hours. The reaction liquid was taken in a large amount of water so as to precipitate crystal. The crystal was dried in vacuo to obtain the captioned product in the amount of 5.0 g.

(2) Methyl-4'-(benzyloxy)-biphenyl-4-carboxylate

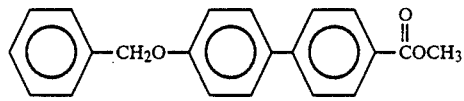

The product obtained in Item (1) in the amount of 4.1 g was dissolved in 100 ml of dimethylaminoformamide. The solution was added with anhydrous potassium carbonate 3.6 g and after heating upto 110° C. dropped with benzyl bromide 4.1 g during one hour to be stirred thereafter at a temperature of 140° C. for 4 hours. The reaction solution was taken into a large amount of water to precipitate crystal, which was dried to obtain the captioned product in the amount of 6.6 g.

(3) 4'-(Benzyloxy)-biphenyl-4-carboxylic acid

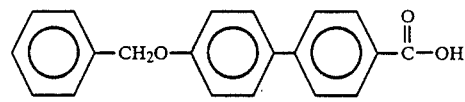

The carboxylate obtained in Item (2) in the amount of 5.0 g was taken into the solvent mixture of 20 ml water and 200 ml methanol containing potassium hydroxyde 2.26 g to be refluxed for 24 hours. The reaction mixture was taken into a large amount of water to precipitate crystal, added with hydrochloric acid until the aqueous solution came to be acidic, and refluxed for 5 minutes to collect crystalline product. The crystalline product was washed with water and dried to obtain the captioned product.

(4) 4'-(Benzyloxy)-biphenyl-4-carboxylic acid chloride

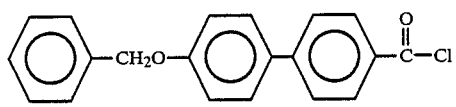

The carboxylic acid obtained in Item (3) in the amount of 4.0 g was taken into thionyl chloride 23.5 g and after adding a drop of dimethylfomamide refluxed for 4 hours. An excessive amount of thionyl chloride was distilled off to obtain the captioned chloride in the amount of about 4 g.

(5) 1-Trifluoro-2-octyl-4'-(benzyloxy)-biphenyl-4-carboxylate

Optically active 1-trifluoro-2-octanol 2.0 g and triethylamine 1.1 g were dissolved in 150 ml ethane dichloride. The solution was droppingly added with the carboxylic acid chloride obtained in the above and in the amount of 3.9 g in 20 ml ethane dichloride at the room temperature and further added with dimethylaminopyridine 1.3 g to be stirred at the room temperature for 3 days. The reaction liquid was taken into water and after neutrallization extracted with ethane dichloride. The extract was dried with hydrous magnesium sulfurate and distilled for removing ethane dichloride. The residue was purified according to silica gel column cromatography to obtain the captioned product in the amount of 0.74 g.

(6) 1-Trifluoro-2-octyl-4'-hydroxybiphenyl-4-carboxylate

The above carboxylate in the amount of 0.5 g was taken into 50 ml ethanol and added with 10% palladium/carbon catalyst 0.1 g to be vigorously stirred under hydrogen atmosphere at the room temperature for hours. After removing the catalyst and distilling off ethanol, the captioned product was obtained in the amount of 2 g.

(7) 4'-(1-Trifluoromethylheptyloxycarbonyl)-biphenyl-4-6-(formyl chloride)-naphthalene-2-carboxylate

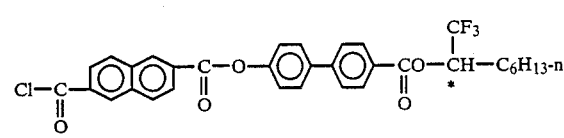

The above carboxylate 0.75 g, 2,6-naphthalene-carboxylc acid dichloride 0.5 g, triethylamine 0.22 g and dimethylaminopyridine 0.015 g were taken into 50 ml dichloroethane to be stirred at the room temperature for a whole day. The reaction liquid was filtered so as to use the filtrate in the following reaction.

(8) 4'-(1-Trifluoromethylheptyloxycarbonyl)-biphenyl-4-6-(n-octyloxycarbonyl)-naphthalene-2-carboxylate (Objective Compound)

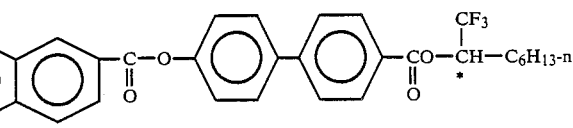

Into the above filtrate, n-octanol 0.3 g, triethylamine 022 g and dimethylaminopyridine 0.015 g were taken to be stirred at the room temperature for a whole day.

After filtering and distilling off the solvent, the residue was subjected to silica gel column chromatography (as developer, hexane/ethyl acetate=10:0.5) to obtain the crude product in the amount of 0.3 g, which was recrystallized with ethanol to obtain 0.07 g objective compound.

The novel objective compound of the invention was confirmed to show following phase transition points as a result of the observation by a microscope with hot stage.

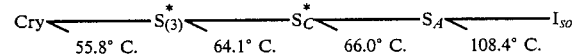

$S_{(3)}$ means tri-stable phase.

Figure 2:
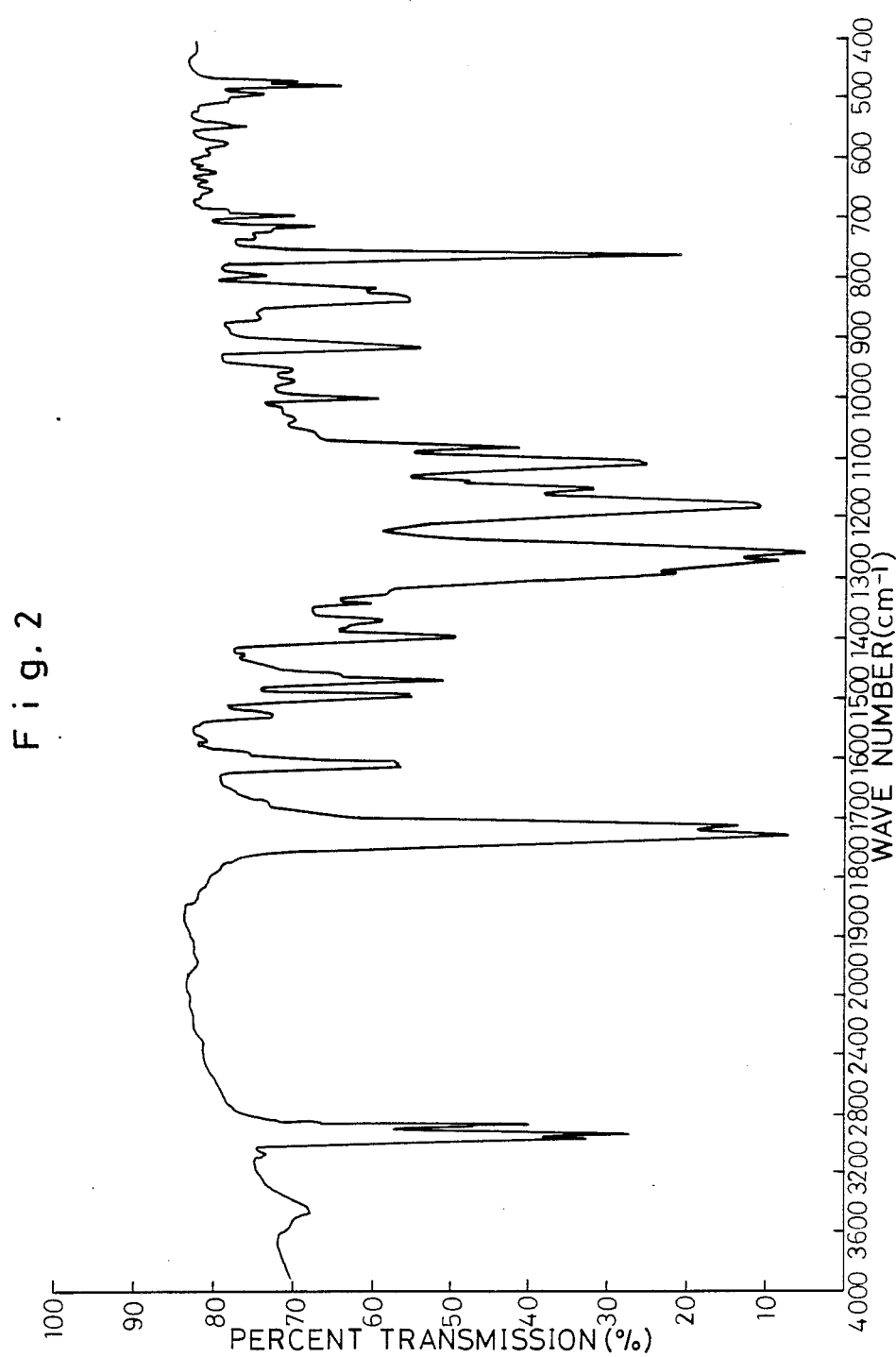
FIG. 2 shows an infrared absorption spectrum (KBr) of the objective compound in Example 2.

The infrared absorption spectrum (IBr) of the objective compound is shown in FIG. 2.

EXAMPLE 3

(1) 6-(1-Trifluoromethylheptyloxy-carbonyl)-naphthalene-2-carboxylic acid chloride

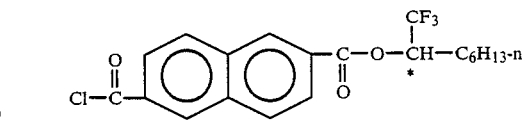

2,6-Naphthalene-dicarboxylic acid dichloride 1.5 g, optically active 1-trifluoro-2-octanol 1.0 g, triethylamine 0.6 g and dimethylaminopyridine 0.04 g were dissolved in 100 ml dichloroethane to be stirred at the room temperature for a whole day. The reaction solution was filtered so as to use the filtrate in the following reaction.

(2)
4'-N-decylbiphenyl-4-6-(1-trifluoromethylheptyloxy-carbonyl)-naphthalene-2-carboxylate (Objective Compound)

(2)
4'-N-decyloxybiphenyl-4-6-(1-trifluoromethylhep-tyloxy-carbonyl)-naphthalene-2-carboxylate

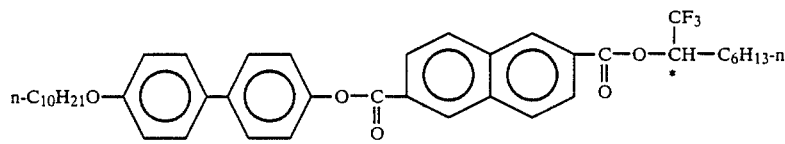

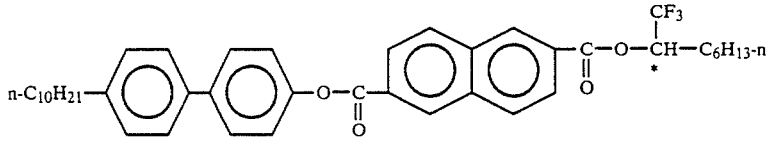

4'-N-decyl-4-hydroxylbiphenyl 1.67 g, triethylamine 0.6 g and dimethylaminopyridine 0.04 g were taken into the filtrate referred to the above to be stirred at the room temperature for a whole day. The reaction liquid was filtered and the solvent was distilled off to subject the residue to silica gel chromatography (as developer, ethylacetate, 10:0.5). The crude product was recrystallized with ethanol to obtain the objective compound in the amount of 0.6 g, which shows a specific rotatory power $[\ ]_D = +43.6°$.

The objective compound of the invention was confirmed to have following phase transition points according to the observation by microscope with hot stage.

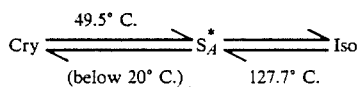

Figure 3:
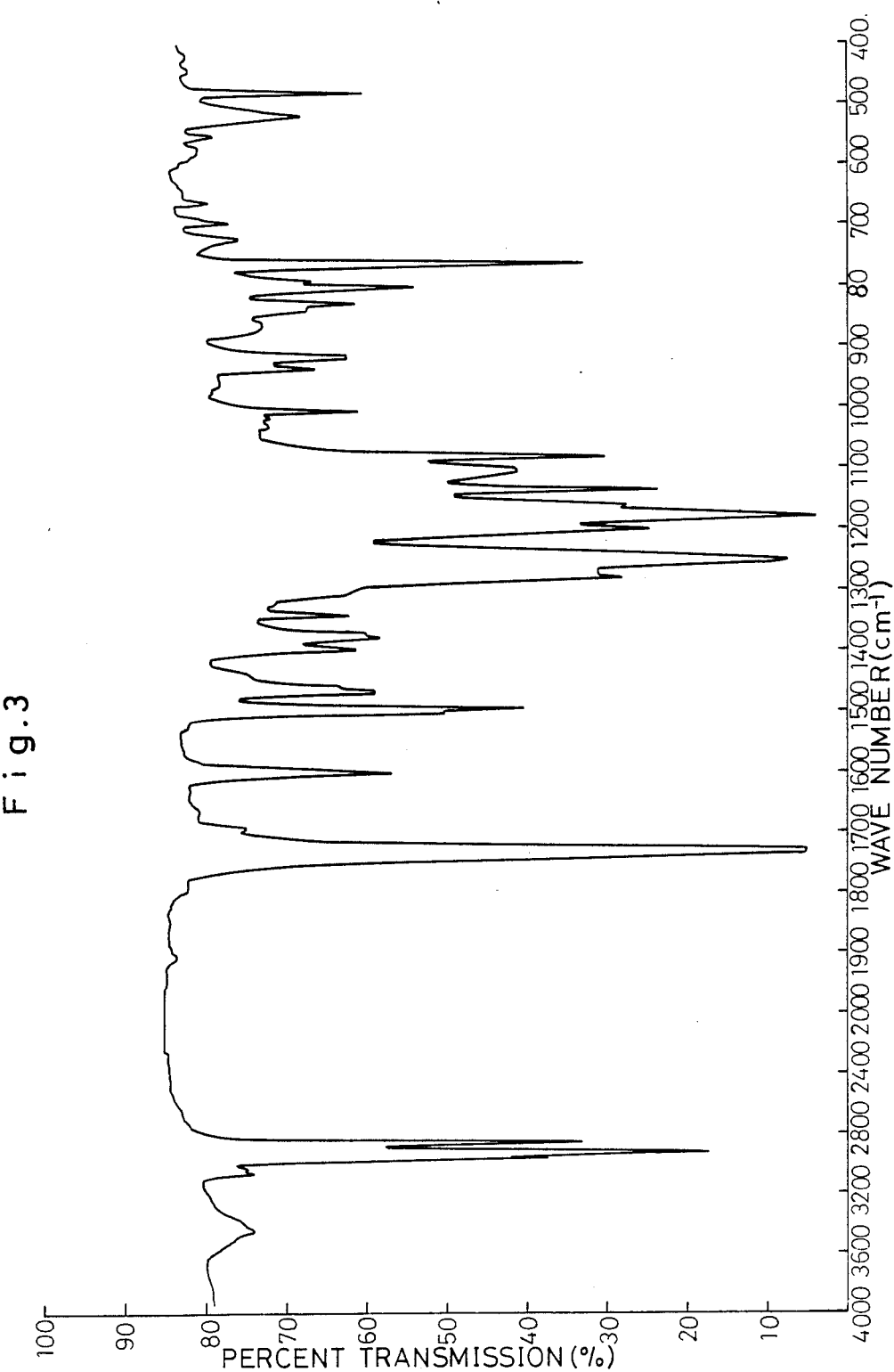
FIG. 3 shows an infrared absorption spectrum (KBr) of the objective compound in Example 3.
Figure 4:
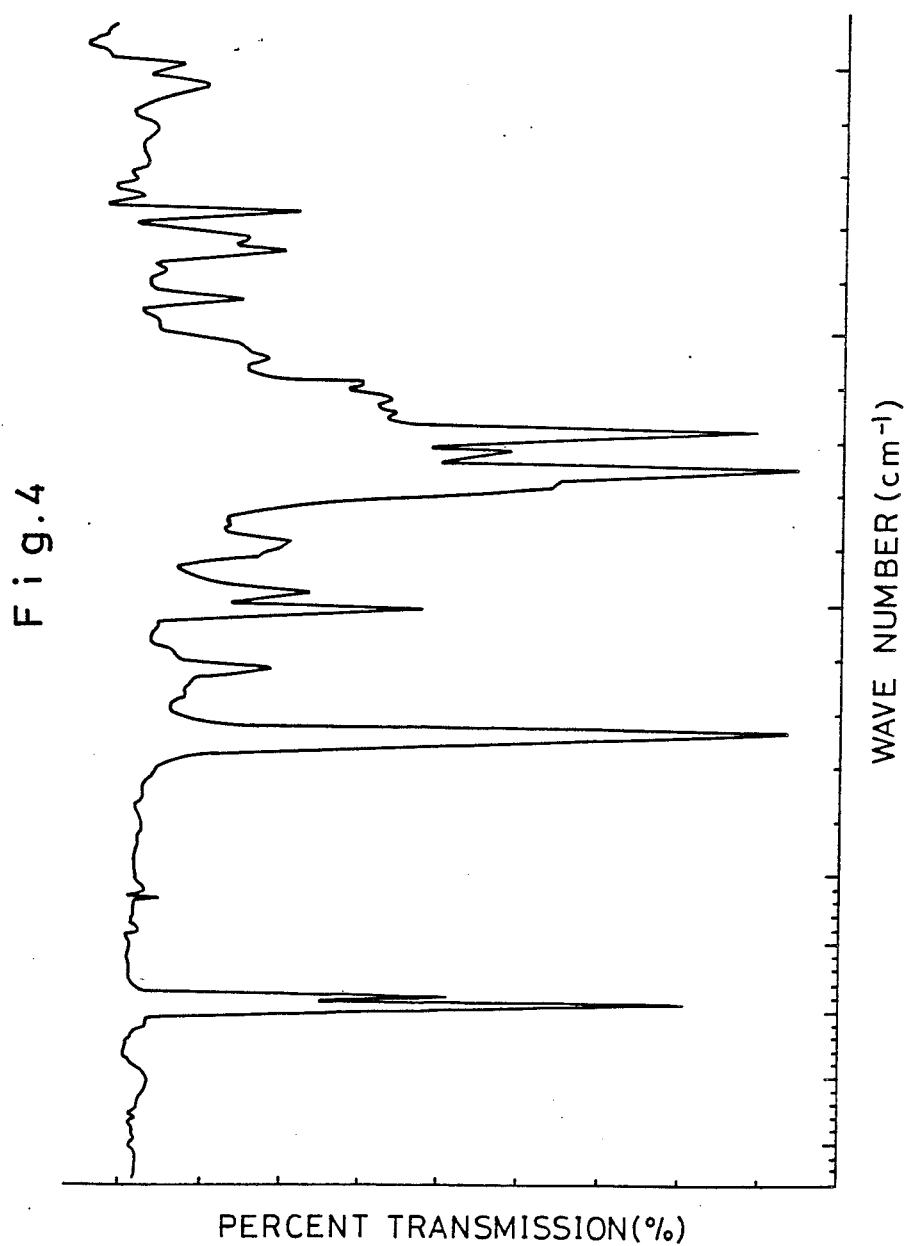
FIG. 4 shows an infrared absorption spectrum (KBr) of the objective compound in Example 4.
Figure 5:
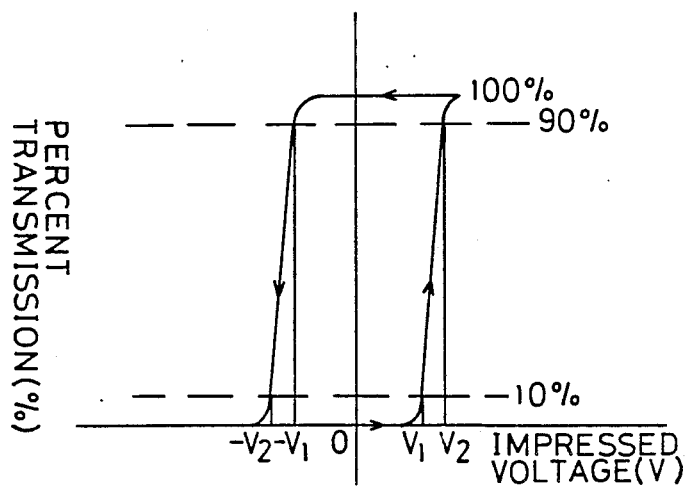
FIG. 5 is coordinates in which the ordinate is a permission (%) and the abscissa is an impressed voltage (V), showing a hysteresis of the liquid crystal of ideal bi-stable phase.
Figure 6:
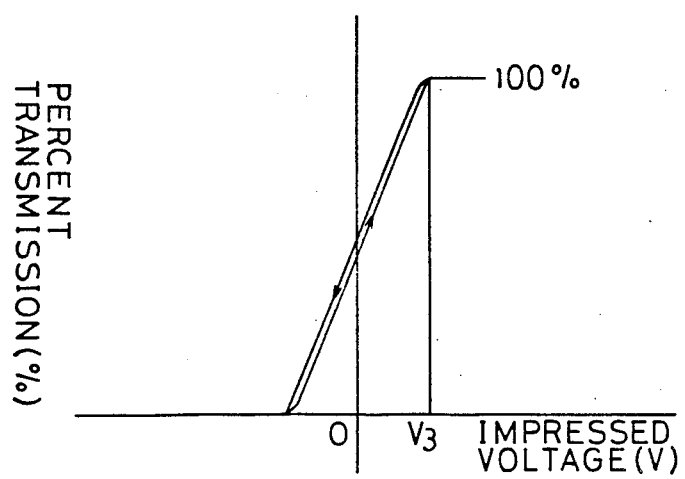
FIG. 6 is a similar view of one of the liquid crystals having been synthesized until now having bi-stable phase.
Figure 7:
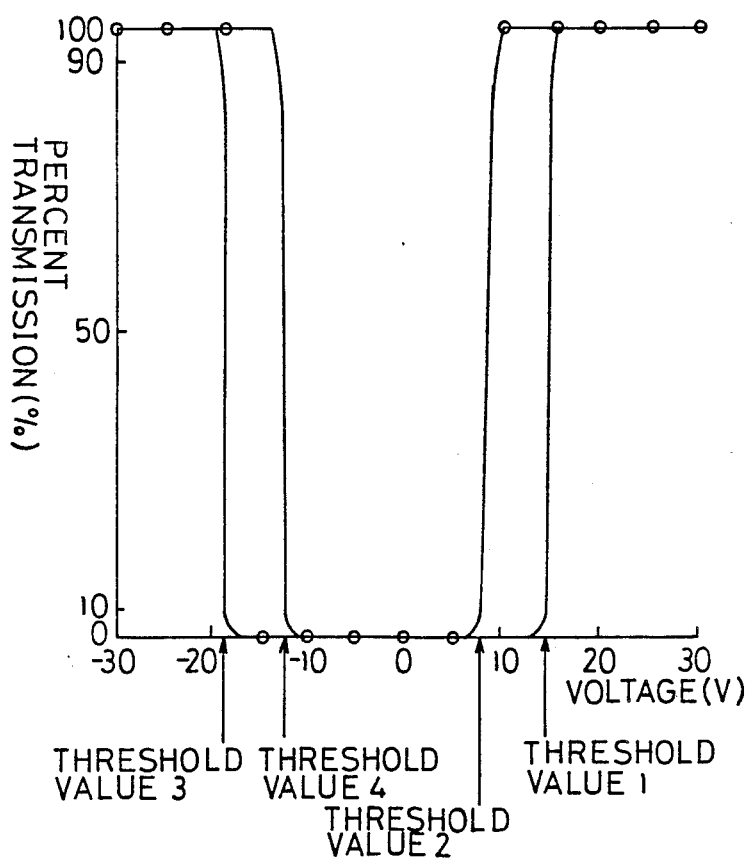
FIG. 7 is a similar view of a liquid crystal of tri-stable phase according to the invention.

The infrared absorption spectrum thereof is shown in FIG. 3.

EXAMPLE 4

(1) 6-(1-Trifluoromethylheptyloxycarbonyl)-2-carboxynaphthalene

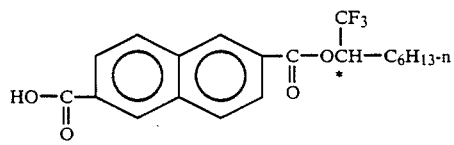

2,6-Naphthalene-dicarboxylic acid chloride 14 g was dissolved in methylene chloride. The solution was gradually added under ice cooling with optically active 1-trifluoro-2-octanol 10 g and pyridine 0.85 g. After further reaction at the room temperature for a whole day, the reaction liquid was taken into water and extracted with methylene chloride. The extract was washed with ammonium chloride, water, 1N aqueous sodium hydrogenecarbonate solution and water in this order, and after neutrallization dried with anhydrous magnesium sulfurate. After distilling off the solvent, the crude product was subjected to silica gel column chromatography to obtain the captioned product in the amount of 2.5 g.

The above product 2.5 g, 4-n-decyloxy-4'-hydroxybiphenyl 2.4 g and dicyclohexy-carbodiimide 2 g were added to 25 ml tetrahydrofuran to be reacted at the room temperature for a whole day.

The reaction liquid was taken into water and after filtering the filtrate was extracted with ether. The extract was well washed with water and dried with anhydrous magnesium sulfate. After removing the solvent by distillation, the crude product was purified by silica gel column chromatography (hexane/ethyl acetate, 10:0.5) and further recrystallization with ethanol to obtain the objective compound in the amount of 0.97 g.

What is claimed is:

1. A liquid crystal compound of a naphthalene nucleus represented by the formula

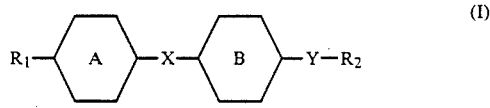

in which $R_1$ means an alkyl, alkoxy or alkyloxycarbonyl group, each having 1–20 carbon atoms, $R_2$ means an optically active

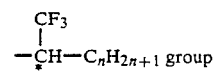

wherein n is an integer from 4–14, X

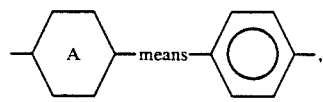

means —CO— or —OC—, Y means —CO—,

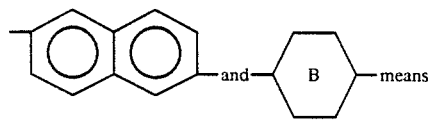

-continued

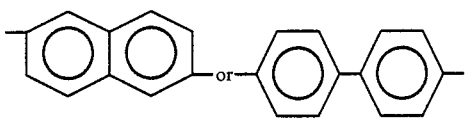

2. A liquid crystal compound of a naphthalene nucleus represented by the formula

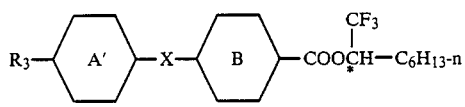 (II)

in which $R_3$ means an alkyloxycarbonyl group of 5–15 carbon atoms,

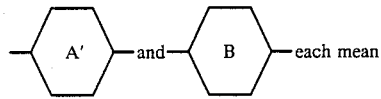 each mean

-continued

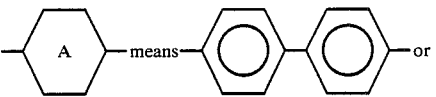

and X means $-\overset{\overset{O}{\|}}{C}O-$ or $-O\overset{\overset{O}{\|}}{C}-$.

3. A liquid crystal compound of claim 1, wherein n is an integer from 6–12.

4. A liquid crystal compound of claim 1, wherein

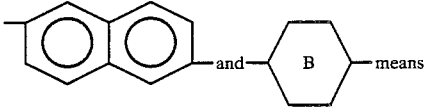

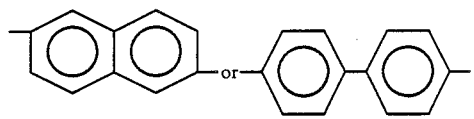

5. A liquid crystal compound of claim 4, wherein n is an integer from 6–12.

* * * * *